(12) United States Patent
Nagaoka et al.

(10) Patent No.: US 11,439,983 B2
(45) Date of Patent: Sep. 13, 2022

(54) ACTIVE PEROVSKITE-TYPE CATALYSTS STABLE TO HIGH TEMPERATURE AGING FOR GASOLINE EXHAUST GAS APPLICATIONS

(71) Applicant: JOHNSON MATTHEY PUBLIC LIMITED COMPANY, London (GB)

(72) Inventors: Shuhei Nagaoka, Tochigi (JP); Kerry Simmance, Reading (GB); Andrea Eva Pascui, Reading (GB); Emily Price, Reading (GB)

(73) Assignee: Johnson Matthey Public Limited Company, London (GB)

(*) Notice: Subject to any disclaimer, the term of this patent is extended or adjusted under 35 U.S.C. 154(b) by 147 days.

(21) Appl. No.: 16/832,018

(22) Filed: Mar. 27, 2020

(65) Prior Publication Data

US 2020/0306730 A1    Oct. 1, 2020

Related U.S. Application Data

(60) Provisional application No. 62/830,431, filed on Apr. 6, 2019, provisional application No. 62/826,040, filed on Mar. 29, 2019.

(51) Int. Cl.
*B01J 23/00* (2006.01)
*B01D 53/94* (2006.01)
(Continued)

(52) U.S. Cl.
CPC .......... *B01J 23/002* (2013.01); *B01D 53/945* (2013.01); *B01J 21/04* (2013.01); *B01J 21/066* (2013.01);
(Continued)

(58) Field of Classification Search
CPC ........ B01J 23/002; B01J 21/04; B01J 21/066; B01J 23/34; B01J 23/83; B01J 35/1014;
(Continued)

(56) References Cited

U.S. PATENT DOCUMENTS

| 5,182,249 A | 1/1993 | Wang et al. |
| 5,380,692 A * | 1/1995 | Nakatsuji ........... B01D 53/9418 502/241 |
| 5,939,354 A * | 8/1999 | Golden .................. B01J 23/002 502/328 |

(Continued)

FOREIGN PATENT DOCUMENTS

| CN | 103887520 A | * | 6/2014 |
| WO | 2018224946 A1 | | 12/2018 |

OTHER PUBLICATIONS

Machine translation of CN-103887520-A (Year: 2014).*
Costa et al. "An Investigation of the NO/H2/O2 (Lean-deNOx) Reaction on a Highly Active and Selective Pt/La0.5Ce0.5MnO3 Catalyst" Journal of Catalysis 197, 350-364 (2001). (Year: 2001).*
(Continued)

*Primary Examiner* — Wayne A Langel
(74) *Attorney, Agent, or Firm* — Ni Yan (57) ABSTRACT

Compositions, articles, and methods related to a three-way-catalyst composition comprising a perovskite-type compound of formula (I): $La_zB_{1-q}B'_qO_{3\pm\delta}$ or formula (II): $[BO_x]_y \cdot [La_zBO_{3\pm\delta}]_{1-y}$, and a non-redox active component; wherein B or B' is Fe, Mn, Co, Ni, Cu, Ti, or Zr; q is in a range from about 0 to about 0.5; x is from about 1 to about 2.5; y is from about 1 to about 30 wt %; z is about 0.6 to about 1.1; $\delta$ is in a range from about 0 to about 0.6.

19 Claims, 2 Drawing Sheets

(51) Int. Cl.
| | |
|---|---|
| *B01J 21/04* | (2006.01) |
| *B01J 21/06* | (2006.01) |
| *B01J 23/34* | (2006.01) |
| *B01J 23/83* | (2006.01) |
| *B01J 35/10* | (2006.01) |
| *B01J 37/00* | (2006.01) |
| *B01J 37/04* | (2006.01) |
| *B01J 37/14* | (2006.01) |
| *F01N 3/10* | (2006.01) |
| *F01N 3/28* | (2006.01) |

(52) U.S. Cl.
CPC .............. *B01J 23/34* (2013.01); *B01J 23/83* (2013.01); *B01J 35/1014* (2013.01); *B01J 37/0072* (2013.01); *B01J 37/04* (2013.01); *B01J 37/14* (2013.01); *F01N 3/101* (2013.01); *F01N 3/28* (2013.01); *B01D 2255/2063* (2013.01); *B01D 2255/2073* (2013.01); *B01D 2255/2092* (2013.01); *B01D 2255/20715* (2013.01); *B01D 2255/20738* (2013.01); *B01D 2255/402* (2013.01); *B01J 2523/31* (2013.01); *B01J 2523/3706* (2013.01); *B01J 2523/48* (2013.01); *B01J 2523/72* (2013.01); *B01J 2523/842* (2013.01); *F01N 2370/04* (2013.01)

(58) Field of Classification Search
CPC ........ B01J 37/0072; B01J 37/04; B01J 37/14; B01J 2523/31; B01J 2523/3706; B01J 2523/48; B01J 2523/72; B01J 2523/842; B01J 37/349; B01J 35/002; B01J 35/023; B01J 2523/00; B01J 23/10; B01D 53/945; B01D 2255/2063; B01D 2255/20715; B01D 2255/2073; B01D 2255/20738; B01D 2255/2092; B01D 2255/402; B01D 2255/9202; B01D 2255/9207; F01N 3/101; F01N 3/28; F01N 2370/04; Y02T 10/12
USPC ...................................................... 423/213.5
See application file for complete search history.

(56) References Cited

U.S. PATENT DOCUMENTS

| | | | | |
|---|---|---|---|---|
| 2003/0059351 | A1* | 3/2003 | Awano | B01D 53/8631 422/171 |
| 2003/0198582 | A1* | 10/2003 | Golden | B01J 23/8892 423/213.2 |
| 2005/0020442 | A1* | 1/2005 | Sermon | B01D 53/945 502/304 |
| 2005/0081443 | A1* | 4/2005 | Aiello | B01J 23/58 48/198.3 |
| 2005/0233897 | A1* | 10/2005 | Tanaka | B01D 53/945 502/302 |
| 2005/0245391 | A1* | 11/2005 | Tanaka | B01J 21/04 502/302 |
| 2005/0249653 | A1* | 11/2005 | Tanaka | C01G 49/0018 423/263 |
| 2012/0046163 | A1* | 2/2012 | Ifrah | C01G 45/1264 502/263 |
| 2014/0274662 | A1 | 9/2014 | Nazarpoor | |
| 2015/0111729 | A1* | 4/2015 | Princivalle | B01D 53/864 502/304 |
| 2015/0182954 | A1 | 7/2015 | Nazarpoor et al. | |
| 2017/0232387 | A1* | 8/2017 | Qi | B01J 35/023 502/303 |
| 2019/0336950 | A1* | 11/2019 | Zheng | F01N 3/101 |

OTHER PUBLICATIONS

Schoen, A., "Development of alternative 3-way catalysts: Fe-based perovskites with low noble metal content", Thesis, Universite Lille, Sciences Et Technologies, France, Mar. 27, 2015, pp. 1-308.

Schoen, A., et al., "Non stoichiometric La1-yFeO3perovskite-based catalysts as alternative to commercial three-way-catalysts?—Impact of Cu and RH doping"—Applied Catalysis B: Environmental, Elsevier, Amsterdam, NL, vol. 223, Jun. 9, 2017, pp. 167-176.

Simmance, K. et al., "Evaluation of perovskite catalysts prepared by flame spray pyrolysis for three-way catalyst activity under simulated gasoline exhaust feeds", Catalysis Today, vol. 320, Dec. 30, 2017, pp. 40-50.

Specchia, S., et al., In situ combustion synthesis of perovskite catalysts for efficient and clean methane premixed metal burners!—Chemical Engineering Science, Oxford, GB, vol. 59, No. 22-23, Oct. 12, 2004, pp. 5091-5098.

* cited by examiner

ACTIVE PEROVSKITE-TYPE CATALYSTS STABLE TO HIGH TEMPERATURE AGING FOR GASOLINE EXHAUST GAS APPLICATIONS

FIELD OF THE INVENTION

Compositions and methods of the present invention relate to a novel catalyst composition including a perovskite-type compound and a non-redox active component, its use as a three-way catalyst (TWC) in exhaust systems for internal combustion engines, and a method for treating an exhaust gas from an internal combustion engine.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is the TWC. TWCs perform three main functions: (1) oxidation of carbon monoxide (CO); (2) oxidation of unburnt hydrocarbons; and (3) reduction of $NO_x$ to $N_2$.

TWCs that usually consist of Platinum Group Metals (PGMs) dispersed over high surface area alumina and ceria-zirconia supports, were first introduced in the early 1980s for gasoline engine aftertreatment. With the need to meet increasingly more stringent emission limits, identifying alternative catalyst compositions which utilize either lower or no PGMs remains an active research topic. Perovskite-type oxides ($ABO_3$) have been long proposed as TWCs. Although there has been a continuous effort to understand and improve the catalytic properties of perovskites for automotive applications, such catalysts often show deactivation when subjected to harsh aging conditions. Thus, there are still needs to improve novel TWC compounds which are stable to high temperature aging.

SUMMARY OF THE INVENTION

According to aspects of the present invention, a three-way-catalyst composition comprises a perovskite-type compound of formula (I): $La_zB_{1-q}B'_qO_{3\pm\delta}$ or formula (II): $[BO_x]_y:[La_zBO_{3\pm\delta}]_{1-y}$, and a non-redox active component; wherein B and B' is Fe, Mn, Co, Ni, Cu, Ti, or Zr; z is in a range from about 0.6 to about 1.1; q is in a range from about 0 to about 0.5; $\delta$ is in a range from about 0 to about 0.6; x is from about 1 to about 2.5; y is from about 1 to about 30 wt %. In some aspects, the non-redox active component comprises, for example, an oxide, alumina, $ZrO_2$, or combinations thereof. In some aspects, the $ZrO_2$ is doped.

In some aspects, the catalyst may be free of platinum group metals, or substantially free of platinum group metals.

In some aspects, the perovskite-type compound is present in an amount of about 5 wt % to about 75 wt % of the catalyst composition. In some aspects, the non-redox active component is present in an amount of about 25 wt % to about 95 wt % of the catalyst composition. In some aspects, the perovskite-type compound and the non-redox active component are present in a weight ratio of about 0.5:1 to about 3:1.

In some aspects, the perovskite-type compound is prepared by flame spray pyrolysis. The perovskite-type compound may have a high surface area.

According to some aspects of the present invention, a catalyst article for treating exhaust gas, includes a substrate; and the three-way-catalyst composition as described herein.

According to some aspects of the present invention, a method of treating an exhaust gas from an internal combustion engine includes contacting the exhaust gas with a catalyst article comprising a substrate and the three-way-catalyst composition as described herein. In some aspects, the three-way-catalyst composition of the present invention provides (1) a fresh NO conversion at 500-600° C., and (2) an aged NO conversion at 500-600° C. after aging the catalyst at a temperature of at least 700° C. for 20 hours in the presence of steam, wherein a delta between the fresh NO conversion and the aged NO conversion is a decrease of less than 20%. In some aspects, the delta between the fresh NO conversion and the aged NO conversion is a decrease of less than 15%. In some aspects, the three-way-catalyst composition of the present invention provides (1) a fresh HC or CO conversion at 500° C., and (2) an aged HC or CO conversion at 500° C. after aging the catalyst at a temperature of at least 700° C. for 20 hours in the presence of steam, wherein a delta between the fresh HC or CO conversion and the aged HC or CO conversion is a decrease of less than 50%. In some aspects, the delta between the fresh HC or CO conversion and the aged HC or CO conversion is a decrease of less than 40%.

BRIEF DESCRIPTION OF THE DRAWINGS

FIG. 1 shows TEM images of Comparative Catalyst 4 (1a and 1b) and Catalyst 5A (1c and 1d) fresh and aged, respectively.

FIG. 2 shows particle size analysis of TEM images in FIG. 1: $MnO_x:La_{0.9}MnO_3$ (Comparative Catalyst 4) aged (2a), $MnO_x:La_{0.9}MnO_3$ with doped $ZrO_2$ (Catalyst 5A) fresh (2b), $MnO_x:La_{0.9}MnO_3$ with doped $ZrO_2$ (Catalyst 5A) aged (2c). x-axis: particle size, y-axis: number of particles.

DETAILED DESCRIPTION OF THE INVENTION

Compositions and methods of the present invention relate to a novel catalyst composition including a perovskite-type compound and a non-redox active component. Such compositions may be used as a three-way catalyst (TWC) in exhaust systems for internal combustion engines, and as part of a method for treating an exhaust gas from an internal combustion engine. It has been found that catalysts of the present invention may provide benefits associated with high temperature stability.

Perovskite-Type Compound $$La_zB_{1-q}B'_qO_{3\pm\delta} \qquad \text{Formula (I):}$$

Catalyst compositions of the present invention contain a perovskite-type compound. In some embodiments, the perovskite-type compound can have a formula (I): $La_zB_{1-q}B'_qO_{3\pm\delta}$.

B or B' can be Fe, Mn, Co, Ni, Cu, Ti or Zr; preferably, B or B' can be Fe or Mn. In some embodiments, B or B' is Fe. In other embodiments, B or B' is Mn.

q is in a range from 0 to 0.5; preferably, from 0 to 0.2; more preferably 0.

z is in a range from about 0.6 to about 1.1; preferably, from about 0.7 to about 1.0; more preferably, from about 0.7 to about 0.9.

δ is in a range from about 0 to about 0.6; preferably, from about 0 to about 0.5; more preferably, from about 0.15 to about 0.3.

The compound of formula (I) can be prepared by co-precipitation, flame spry pyrolysis (FSP), ballmilling etc.

FSP can be a combustion method in which soluble precursors in organic solvents are combusted in a $CH_4/O_2$ flame to directly give nano-crystalline particles.

Co-precipitation is not necessarily a one-step process. Unlike the other methods, here precursors in a solution are mixed together and slowly precipitated together through pH control to form a well-mixed amorphous-like precipitate which is then calcined to produce crystalline particles of perovskite phase.

The perovskite-type compound of formula (I) can be prepared by Flame Spray Pyrolysis (FSP). For example, FSP can be a combustion method in which soluble precursors in organic solvents are combusted in a $CH_4/O_2$ flame to directly give nano-crystalline particles. The perovskite-type compound of formula (I) can have a mean primary crystal size of less than 60 nm. In some aspects, the compound of formula (I) has a mean primary crystal size of less than 30, 25, 20, 15, 10, or 5 nm. In some aspects, the compound of formula (I) has a mean primary crystal size of 5 nm-60 nm, 5 nm-50 nm, 5 nm-40 nm, 5 nm-30 nm or 5 nm-20 nm. The perovskite-type compound of formula (I) can be at least 90% phase pure. In some aspects, the perovskite-type compound is at least 95%, 96%, 97%, 98% or 99% phase pure. The perovskite-type compound of formula (I) can have a primary particle morphology of spherical shape. The compound of formula (I) can have a disordered surface as evidenced by TEM.

As used herein, the term "percent" in connection with the perovskite-type materials means:

percent purity=$I_{perovskite\ phase}/(I_{perovskite\ phase}+I_{impurity\ phase})$ I=intensity of crystalline phase, as identified by XRD.

Alternatively, the compound of formula (I) can have a primary particle morphology of hexagonal, cubic, rod, flower or faceted shape.

Perovskite-type compounds prepared by FSP can have an average primary particle size ranging between 5 and 20 nm with a primary particle morphology of spherical shape as highlighted in the TEM images for a $LaFeO_3$ based perovskite. The crystallite size as calculated from XRD also agrees with the primary particle size observed by TEM. The nano-crystalline material has a somewhat disordered/amorphous-like surface as evidenced by TEM, which may enhance its activity for TWC by allowing for more oxygen vacancies to be created at the surface and/or a higher concentration of active B site cations at the surface. The primary nanoparticles agglomerate to form larger particles which can be of micron size in their powder form but still retain a high surface area (e.g., >40 $m^2g^{-1}$). The high surface area allows for: a higher concentration of active B cations to be present at the surface as evidenced by XPS, a higher concentration of surface oxygen vacancies as evidenced by $O_2$-TPD, and improved reducibility of the B cation at temperatures below 500° C. as evidenced by $H_2$-TPR.

The phase purity of the compound of formula (I) can be also important for optimum activity; the presence of other crystalline phases, such as $La(OH)_3$, $La_2O_3$, $Fe_2O_3$ etc., results in lower activity. A perovskite prepared by FSP can have a primary particle morphology of spherical shape with a size ranging from 5-60 nm, preferably from 5-30 nm, which may aggregate but retain a high surface area above 40 $m^2g^{-1}$ and have a disordered surface.

Alternatively, the specific surface area of the perovskite-type compound of formula (I) can be at least 6 $m^2/g$, 8 $m^2/g$, 20 $m^2/g$, 30 $m^2/g$, or 40 $m^2/g$.

In some embodiments, the compound of formula (I) can further comprise a promoter. The promoter metal may be any of the recognized catalytically active metals that are used in the catalyst industry, particularly those metals that are known to be catalytically active for treating exhaust gases derived from a combustion process. Promoter metal should be broadly interpreted and specifically includes copper, nickel, zinc, iron, tungsten, molybdenum, cobalt, titanium, zirconium, manganese, chromium, vanadium, niobium, as well as tin, bismuth, and antimony. Preferred transition metals are base metals, and preferred base metals include those selected from the group consisting of chromium, manganese, iron, cobalt, nickel, and copper, and mixtures thereof. In some aspects, suitable base metals include those selected from the group consisting of iron, cobalt, nickel, manganese and copper, and mixtures thereof. In some aspects, the promoter metal is copper, manganese, iron, or a combination thereof. In some aspects, the promoter metal is manganese, iron, or a combination thereof. In some aspects, the promoter metal is copper. In some aspects, the promoter metal is iron. In some aspects, the promoter metal is manganese.

The promoter metal containing perovskite compound composition described above may be obtained via any known technique, such as impregnation methods.

The promoter metal may be present in the composition at a concentration of up to 20 weight percent (wt %) based on the total weight of the composition, for example from 0.1 wt % to 20 wt %, 0.5 wt % to 10 wt %, from 0.5 to 1 wt %, from 1 to 5 wt %, or 2 wt % to 4 wt %. For aspects which utilize copper, iron, manganese, or the combination thereof, the concentration of these promoter metals in the composition may be 1 to 15 wt %, 1 to 10 wt %, 1 to 5 wt %, or 1 to 3 wt %.

$[BO_x]_y:[La_zBO_{3\pm\delta}]_{1-y}$  Formula (II):

In some embodiments, the perovskite-type compound can be a compound of formula (II): $[BO_x]_y:[La_zBO_{3\pm\delta}]_{1-y}$;

B can be Fe, Mn, Co, or Ni; preferably, B can be Fe or Mn. In some embodiments, B is Fe. In other embodiments, B is Mn.

x is from about 1 to about 2.5.

y is from about 1 to about 30 wt %.

z is about 0.7 to about 1.1

δ is in a range from about 0 to about 0.6; preferably, from about 0 to about 0.5; more preferably, from about 0.1 to about 0.3.

$[MnO_x]_y:[La_zMnO_{3\pm\delta}]_{1-y}$  Formula (IIa):

In some embodiments, B can be Mn. In further embodiments, the $La_zMnO_{3\pm\delta}$ can be a crystalline perovskite phase. And in independent alternative or additional embodiments, with respect to the cited composition or the $MnO_x$ or $La_zMnO_{3\pm\delta}$ by themselves (In embodiments wherein B is Mn), as appropriate:

(a) x can be a value in a range of from about 1 to about 1.1, from about 1.1 to about 1.2, from about 1.2 to about 1.3, from about 1.3 to about 1.4, from about 1.4 to about 1.5, from about 1.5 to about 1.6, from about 1.6 to about 1.7, from about 1.7 to about 1.8, from about 1.8 to about 1.9, from about 1.9 to about 2.0, from about 2.0 to about 2.1, from about 2.1 to about 2.2, from about 2.2 to about 2.3, from about 2.3 to about 2.4, from about 2.4 to about 2.5, or a value defined by a range comprising two or more of these ranges, for example, from about 1.6 to about 2.5. For the avoidance of doubt, the representation "$MnO_x$" refers to any binary oxide of manganese having an O:Mn atomic ratio of x. For example, the designation includes $Mn_3O_4$ (x=1.33), $Mn_5O_8$ (x=1.6), and the like. As such, the value x defines a composition of either discrete formulae for oxides of manganese or mixtures thereof, as described elsewhere herein. In certain independent embodiments, the $MnO_x$ is predominantly $Mn_3O_4$ (x=1.33), $Mn_5O_8$ (x=1.6), or a combination thereof;

(b) y can be a value greater or less than the range in the preceding section. In certain embodiments, y can be a value in a range of from about 0 to about 1 wt % (i.e., considering only the $La_zMnO_3$ by itself), 1 to about 2 wt %, from about 2 to about 3 wt %, from about 3 to about 4 wt %, from about 4 to about 5 wt %, from about 5 to about 6 wt %, from about 6 to about 7 wt %, from about 7 to about 8 wt %, from about 8 to about 9 wt %, from about 9 to about 10 wt %, from about 10 to about 11 wt %, from about 11 to about 12 wt %, from about 12 to about 13 wt %, from about 13 to about 14 wt %, from about 14 to about 15 wt %, from about 15 to about 16 wt %, from about 16 to about 17 wt %, from about 17 to about 18 wt %, from about 18 to about 19 wt %, from about 19 to about 20 wt %, from about 20 to about 21 wt %, from about 21 to about 22 wt %, from about 22 to about 23 wt %, from about 23 to about 24 wt %, from about 24 to about 25 wt %, from about 25 to about 26 wt %, from about 26 to about 27 wt %, from about 27 to about 28 wt %, from about 28 to about 29 wt %, from about 29 to about 30 wt %, or y may be defined by any two or more of these ranges, for examples, from about 2 to about 5 wt %;

(c) z can be a value in a range of from about 0.7 to about 0.75, from about 0.75 to about 0.8, from about 0.8 to about 0.85, from about 0.85 to about 0.9, from about 0.9 to about 0.95, from about 0.95 to about 0.98, from about 0.98 to about 0.99, from about 0.99 to about 1, from about 1 to about 1.05, from about 1.05 to about 1.1, or z may be defined by any two or more of these ranges, for examples, from about 0.75 to about 1.1, or from about 0.8 to about 1, or from about 0.8 to about 0.99, or from about 0.8 to about 0.95.

In alternative or additional independent embodiments the $MnO_x$ in the composition may be amorphous, nano-crystalline, or crystalline, or a mixture of amorphous, nano-crystalline, and crystalline materials. When the $MnO_x$, or any other component, is characterized as amorphous, the composition exhibits no discernible PXRD peaks attributable to an oxide of manganese (but its presence can be determined, for example, by TEM measurements). When the $MnO_x$ is characterized as nano-crystalline, the composition exhibits only broad and poorly shaped PXRD peaks attributable to an oxide of manganese. When the $MnO_x$ is characterized as crystalline, the composition exhibits sharp and well-defined PXRD peaks attributable to an oxide of manganese.

In alternative or additional embodiments, the composites comprise particles having a mean surface area in a range of from about 25 to about 60 $m^2/g$, preferably from about 27 to about 45 $m^2/g$. In independent alternative or additional embodiments, the particles are characterized as having a mean surface area in a range of from about 25 to about 27 $m^2/g$, from about 27 to about 29 $m^2/g$, from about 29 to about 31 $m^2/g$, from about 31 to about 33 $m^2/g$, from about 33 to about 35 $m^2/g$, from about 35 to about 37 $m^2/g$, from about 37 to about 39 $m^2/g$, from about 39 to about 41 $m^2/g$, from about 41 to about 43 $m^2/g$, from about 43 to about 45 $m^2/g$, from about 45 to about 47 $m^2/g$, from about 47 to about 49 $m^2/g$, from about 49 to about 51 $m^2/g$, from about 51 to about 53 $m^2/g$, from about 53 to about 55 $m^2/g$, from about 55 to about 57 $m^2/g$, from about 57 to about 60 $m^2/g$, or the particles may characterized as having a mean surface area spanning two or more of these ranges, for example, from about 27 to about 45 $m^2/g$. These surface areas are most conveniently measured by inert gas (e.g. nitrogen or argon) porosimetry and analyzed using BET equation. The specific values cited herein, can be obtained using $N_2$ at 77 K on a 3Flex surface characterization analyzer (Micromeritics).

In alternative or additional embodiments, the particles comprise aggregated and/or fused primary particles, the primary particles are separately compositions of $MnO_x$ and of $La_zMnO_3$. The size of the primary particles of each $MnO_x$ and $La_zMnO_3$ may be the same or may be different. In the context of this disclosure, the term "aggregated and/or fused" refers to the fact that the primary particles, comprising individual crystallites, are further joined together in a bonding mode ("fused") to form larger aggregate particles.

In some embodiments, these primary particles are present in a size range of from about 10 nm to about 60 nm, from about 10 nm to about 50 nm, from about 12 nm to about 50 nm, from about 14 nm to about 50 nm, and/or from about 14 nm to about 25 nm. In alternative or additional embodiments, the primary particles are present in a size in a range of from about 10 nm to about 12 nm, from about 12 nm to about 14 nm, from about 14 nm to about 16 nm, from about 16 nm to about 18 nm, from about 18 nm to about 20 nm, from about 20 nm to about 25 nm, from about 25 nm to about 30 nm, from about 30 nm to about 35 nm, from about 35 nm to about 40 nm, from about 40 nm to about 45 nm, from about 45 nm to about 50 nm, from about 50 nm to about 55 nm, from about 55 nm to about 60 nm, or the primary particle sizes may be defined by a range encompassing two or more of these ranges, for example from about 14 nm to about 25 nm. Unless otherwise specified, the definition of primary particles size ranges are determined by TEM measurements, even recognizing the use of use of TEM as a primary measuring approach is subject to errors associated with particle counting statistics.

Particle sizes may also be determined by analyzing the line broadening of reflections in XRD patterns (using Rietveld analysis). This approach measures the unit cell repeat distance in the specific direction of the reflections lattice plane. In the present case, measured sizes tend to be characterized at the lower end of these ranges and have narrower distributions, suggesting that even these primary particles are present as one or more crystallites of the stated compositions. For example, the range of from about 14 to about 25 nm for the primary particle size is consistent with the size of typical crystallite sizes measured by XRD. In one example, primary particles measured as having sizes in a range of from about 10 nm to about 60 nm by TEM were determined from XRD (i.e., average value calculated based on linewidth broadening) to have sizes of about 12-20 nm for $La_{0.9}MnO_3$, about 12-30 nm for $Mn_3O_4$, and about 15 nm for $La_2O_2CO_3$.

The primary particle sizes of the $MnO_x$ and the $La_zMnO_3$, but especially the $La_zMnO_3$, may form the bases of embodiments that are independent of the compositions generally described above; i.e., where the limitation of y is relaxed and can be 0. That is, in independent embodiments, a composition may be described exclusively in terms of primary particles of $La_zMnO_3$ (i.e., exclusive of other Mn- or La-containing materials) having a size in a range of from about 10 to about 60 nm, or any of the permutations or combinations of subranges associated with the primary particle sizes. Consistent with the particle sizes described elsewhere herein, the primary particles may be aggregated into larger structures.

Alternatively or additionally, the crystalline $La_2MnO_3$, whether as a component in the composition or by itself, has an A-site occupancy in a range of from about 0.7 to about 0.72, from about 0.72 to about 0.74, from about 0.74 to about 0.76, from about 0.76 to about 0.78, from about 0.78 to about 0.8, from about 0.8 to about 0.82, from about 0.82 to about 0.84, from about 0.84 to about 0.86, from about 0.86 to about 0.88, from about 0.88 to about 0.90, from about 0.90 to about 0.92, from about 0.92 to about 0.94, from about 0.94 to about 0.96, from about 0.96 to about 0.98, from about 0.98 to about 1.0, from about 1.0 to about 1.02, from about 1.02 to about 1.04, from about 1.04 to about 1.06, from about 1.06 to about 1.08, from about 1.08 to about 1.1, or may be defined in terms of two or more of these ranges, for example in a range of from about 0.90 to about 1.0, or from about 0.92 to about 0.98.

In additional embodiments, the disclosed composition further comprises an oxide, hydroxide, and/or carbonate of lanthanum, for example LaOOH and/or $La_2O_2CO_3$. As with the $MnO_x$, the lanthanum components may be amorphous, nano-crystalline, and/or crystalline.

Non-Redox Active Component

Catalyst compositions of the present invention may contain a non-redox active component, such as one or more non-redox active oxides. Suitable non-redox active oxides may include, for example, alumina, $ZrO_2$, doped $ZrO_2$ such as Nb, Nd, Y or La doped $ZrO_2$, or combinations thereof. Suitable types of alumina may include, for example, gamma- delta-, theta-, and alpha-alumina.

Three-Way Catalyst Composition

Another aspect of the present disclosure is directed to a three-way catalyst composition comprising a perovskite-type compound and a non-redox active component. In some aspects, the three-way catalyst is free of platinum group metals. In some aspects, the three-way catalyst is substantially free of platinum group metals. In some aspects, the three-way catalyst is essentially free of platinum group metals.

In some aspects, a three-way catalyst composition comprises a perovskite-type compound and a non-redox active component in a weight ratio of about 0.5:1 to about 3:1; about 0.7:1 to about 2.7:1; about 1:1 to about 2.5:1; about 1.3:1 to about 2.5:1; about 1.5:1 to about 2.5:1; about 1.7:1 to about 2.2:1; or about 2:1.

In some aspects, a three-way catalyst composition includes a perovskite-type compound in an amount of about 5 wt % to about 75 wt %; about 10 wt % to about 75 wt %; about 15 wt % to about 75 wt %; about 20 wt % to about 70 wt %; about 25 wt % to about 65 wt %; about 30 wt % to about 60 wt %; about 35 wt % to about 55 wt %; about 40 wt % to about 50 wt %; about 15 wt % to about 45 wt %; about 20 wt % to about 40 wt %; about 25 wt % to about 35 wt %; about 45 wt % to about 75 wt %; about 50 wt % to about 70 wt %; or about 55 wt % to about 65 wt %, of the catalyst composition.

In some aspects, a three-way catalyst composition includes a non-redox active component in an amount of about 25 wt % to about 95 wt %; about 25 wt % to about 90 wt %; about 25 wt % to about 85 wt %; about 25 wt % to about 80 wt %; about 25 wt % to about 75 wt %; about 30 wt % to about 70 wt %; about 35 wt % to about 65 wt %; about 40 wt % to about 60 wt %; about 45 wt % to about 55 wt %; about 25 wt % to about 50 wt %; about 30 wt % to about 45 wt %; about 35 wt % to about 40 wt %; about 50 wt % to about 75 wt %; about 55 wt % to about 70 wt %; or about 60 wt % to about 65 wt %, of the catalyst composition.

In some aspects, a three-way catalyst composition includes a perovskite-type compound and alumina. In some aspects, a three-way catalyst composition includes a perovskite-type compound and $ZrO_2$. In some aspects, a three-way catalyst composition includes an iron perovskite-type compound and alumina. In some aspects, a three-way catalyst composition includes a manganese perovskite-type compound and alumina. In some aspects, a three-way catalyst composition includes an iron perovskite-type compound and $ZrO_2$. In some aspects, a three-way catalyst composition includes a manganese perovskite-type compound and $ZrO_2$.

Articles, Systems, and Methods

Catalyst articles of the present invention may include a catalyst composition as described herein and a substrate. In some aspects, a catalyst article may include a perovskite-type compound at a loading of up to about 2 $g/in^3$; about 0.5 $g/in^3$ to about 2 $g/in^3$; about 0.5 $g/in^3$ to about 1.5 $g/in^3$; or about 1 $g/in^3$. In some aspects, a catalyst article may include a non-redox active component at a loading of up to about 3 $g/in^3$; about 0.5 $g/in^3$ to about 3 $g/in^3$; about 1 $g/in^3$ to about 3 $g/in^3$; about 1.5 $g/in^3$ to about 2.5 $g/in^3$; about 1 $g/in^3$ to about 2 $g/in^3$; about 2 $g/in^3$; or about 1 $g/in^3$.

Catalyst compositions may be applied to a substrate by any known means, including application of a washcoat. Suitable substrates may include is a flow-through monolith, or wall flow gasoline particulate filter. Preferably, the substrate is a flow-through monolith.

A flow-through monolith substrate may have a first face and a second face defining a longitudinal direction there between. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 900 channels per square inch, preferably from 300 to 750. For example, on the first face, the density of open first channels and closed second channels is from 300 to 750 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In aspects wherein the catalyst article of the present comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In aspects wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

In some aspects, the catalyst composition is supported/deposited directly on the substrate.

The invention also encompasses an exhaust system for internal combustion engines that comprises the three-way catalyst component of the invention. In the exhaust system, the three-way catalyst component may be placed in a close-coupled position or in the underfloor position.

The invention also encompasses treating an exhaust gas from an internal combustion engine, in particular for treating exhaust gas from a gasoline engine. The method comprises contacting the exhaust gas with the three-way catalyst component of the invention.

Benefits

It has surprisingly been found that the mixing a perovskite-type compound with a non-redox active component provides a three-way catalyst composition that is active even after aging conditions, including high temperature aging conditions. This high temperature stability is beneficial, as traditional perovskite-type three-way catalyst compositions were found to deactivate after aging.

In some aspects, a three-way catalyst composition of the present invention [e.g., comprising a perovskite-type compound of formula (I)] may provide a fresh NO conversion at 500-600° C., and an aged NO conversion at 500-600° C. after aging the catalyst at a temperature of at least 700° C. for 20 hours in the presence of steam, wherein the delta between the fresh NO conversion and the aged NO conversion is a decrease of less than 20%; less than 15%; less than 10%; or less than 5%.

In other aspects, a three-way catalyst composition of the present invention [e.g., comprising a perovskite-type compound of formula (II)] may provide a fresh CO or HC conversion at 500° C., and an aged CO or HC conversion at 500° C. after aging the catalyst at a temperature of at least 700° C. for 20 hours in the presence of steam, wherein the delta between the fresh CO or HC conversion and the aged CO or HC conversion is a decrease of less than 50%; less than 40%; less than 30%; or less than 20%.

Terms

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments or aspects, may also be provided in combination in a single embodiment or aspect. That is, unless obviously incompatible or specifically excluded, each individual embodiment is deemed to be combinable with any other embodiment(s) or aspect(s) and such a combination is considered to be another embodiment. Conversely, various features of the invention that are, for brevity, described in the context of a single embodiment or aspect, may also be provided separately or in any sub-combination. Finally, while an embodiment or aspect may be described as part of a series of steps or part of a more general structure, each said step may also be considered an independent embodiment aspect in itself, combinable with others.

The transitional terms "comprising," "consisting essentially of," and "consisting" are intended to connote their generally accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially" of. For those embodiments provided in terms of "consisting essentially of," the basic and novel characteristic(s) is the ability of the catalyst compositions to simultaneously treat NOx, CO, and HC in a vehicular exhaust system efficiently, with air-to-fuel ratio robustness. Materials or steps which do not detract from such operability would be considered within the scope of such embodiments.

When a list is presented, unless stated otherwise, it is to be understood that each individual element of that list, and every combination of that list, is a separate embodiment. For example, a list of embodiments or aspects presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

"Optional" or "optionally" means that the subsequently described circumstance may or may not occur, so that the description includes instances where the circumstance occurs and instances where it does not. Similarly, embodiments which refer to a component or step as being "optionally present," those embodiments include separate independent embodiments in which the step or component is present or absent. The description "optional" allows for, but does not require, the optional condition to occur.

The following examples merely illustrate the invention. Those skilled in the art will recognize many variations that are within the spirit of the invention and scope of the claims.

The following examples merely illustrate the invention. Those skilled in the art will recognize many variations that are within the spirit of the invention and scope of the claims.

EXAMPLES

Materials produced in the examples described below were characterized by one or more of the following analytic methods. Powder X-ray diffraction (PXRD) patterns were collected on a Bruker D8 powder diffractometer using a CuKα radiation (40-45 kV, 40 mA) at a step size of 0.04° and a 1 s per step between 5° and 100° (2θ). Transmission electron microscopy (TEM) images were obtained on a JEM 2800 (Scanning) TEM with 200 kV Voltage. The micropore volume and surface area were measured using $N_2$ at 77 K on a 3Flex surface characterization analyzer (Micromeritics). Materials All reagent materials are commercially available and were obtained from known suppliers, unless noted otherwise.
Flame Spray Pyrolysis (FSP):

An FSP perovskite material is typically synthesized by liquid feed flame pyrolysis. The precursors are dissolved in a suitable solvent at a specific temperature. The solution is then fed with an oxygen stream into a flame. The particles are conveyed through stainless steel ducting to a bag house with air filter bag and recovered by back-pulsing the filter bag.

Comparative Catalyst 1 ($La_{0.8}FeO_3$):

Lanthanum(III) 2-ethylhexanoate solution (27.78 g, 0.02 mole) and iron(III) acetylacetonate (8.84 g, 0.025 mole) were dissolved in 150 mL of xylene. The solution (200 mL, 0.33 mol/L) was then fed with an oxygen stream (dispersion and sheath flow rate 20 L/min) into a $CH_4/O_2$ flame (1.5/3.2 L/min mix) at a rate of 10 mL/min. The particles were conveyed through stainless steel ducting to a bag house with air filter bag (Whatman GF/D filter papers) and recovered by back-pulsing the filter bag. The resulting Comparative Catalyst 1 was phase pure with an average crystallite size of 12 nm as evidenced by XRD. Comparative Catalyst 1 had a specific surface area of 80 $m^2g^{-1}$ with spherical particle morphology and a surface composition of La/Fe=1.1 (XPS).

Catalyst 2 (Comparative Catalyst 1+$Al_2O_3$):

Catalyst 2 was prepared by physically mixing the powders of Comparative Catalyst 1 with gamma alumina ($Al_2O_3$) in a 2:1 weight ratio.

Catalyst 3 (Comparative Catalyst 1+$ZrO_2$):

Catalyst 3 was prepared by physically mixing the powders of Comparative Catalyst 1 with monoclinic zirconia ($ZrO_2$) in a 2:1 weight ratio.

Example 1

Comparative Catalyst 1, Catalyst 2 and Catalyst 3 were tested under standard perturbed gasoline conditions at temperatures between 500° C.-600° C. The catalysts were then subjected to aging conditions involving temperatures ≥700° C. in the presence of steam and under rich/lean conditions for 20 hours. The specific conditions are included below:

Testing conditions: Perturbed gas mixture (WHSV=750 $Lg^{-1}h^{-1}$), λ±0.05: 0.73-2.2% CO+666 ppm $C_3H_6$+333 ppm $C_3H_8$+2200 ppm NO+0.23-0.69% $H_2$+*$O_2$+14% $CO_2$+4% $H_2O$ ($N_2$ balanced) 3 s per perturbation Aging conditions: Perturbed gas mixture, λ=0.93–1.06: 0.5% CO+1000 ppm $C_3H_8$+1000 ppm NO+0.27-1.07% $O_2$+10% $H_2O$ ($N_2$ balanced) 5 mins per perturbation

TABLE 1

CO/HC/NO Conversions at 500° C. for Fresh and Aged Catalysts at λ = 0.99 ± 0.05

| | Fresh | | | Aged | | |
|---|---|---|---|---|---|---|
| | CO Conversion | HC Conversion | NO Conversion | CO Conversion | HC Conversion | NO Conversion |
| Comparative Catalyst 1 | 61 | 64 | 56 | 7 | 25 | 1 |
| Catalyst 2 | 64 | 72 | 56 | 32 | 58 | 42 |
| Catalyst 3 | — | — | — | 33 | 49 | 38 |

TABLE 2

CO/HC/NO Conversions at 600° C. for Fresh and Aged Catalysts at λ = 0.99 ± 0.05

| | Fresh | | | Aged | | |
|---|---|---|---|---|---|---|
| | CO Conversion | HC Conversion | NO Conversion | CO Conversion | HC Conversion | NO Conversion |
| Comparative Catalyst 1 | 63 | 80 | 56 | 12 | 44 | 4 |
| Catalyst 2 | 71 | 85 | 58 | 39 | 74 | 51 |
| Catalyst 3 | — | — | — | 34 | 62 | 45 |

As shown in Tables 1 and 2 above, Comparative Catalyst 1, when fresh, has >50% conversion of CO/HC/NO under standard perturbed gasoline conditions between 500-600° C., however when subjected to aging conditions, the catalyst shows a severe deactivation resulting in CO/NO conversions ≤15% between 500-600° C. Catalyst 2 (which includes the alumina) and Catalyst 3 (which includes the zirconia), however, was able to retain significantly more activity after the harsh aging conditions. To summarize, after aging at high temperatures Catalyst 1 shows up to 90% loss in its ability to convert CO, HC and NO, however, when the catalyst was mixed with alumina (Catalyst 2) or zirconia (Catalyst 3), there is a much smaller loss in catalyst activity with CO/HC/NO conversions remaining above 30%.

Comparative Catalyst 4 ($MnO_x$:$La_{0.9}MnO_3$)

KOH (85%, 8.41 g, 0.127 mol) was dissolved in water (200 mL) and the solution was stirred at 400 rpm using a magnetic stirrer bar and heated to 60° C. Lanthanum nitrate hexahydrate (7.58 g, 0.0175 mol) and manganese nitrate (50 wt/w % solution, 8.95 g, 0.025 mol) were dissolved in water to give 100 mL total volume of solution. The salt solution was added to the base at 10 mL/min. When the addition was complete the precipitate was aged with stirring for 30 mins at 60° C. The material was collected by filtration, washed to remove adsorbed ions and dried at 105° C. The sample was fired at 700° C. for 2 h in air to form perovskite phase. Perovskite crystallite size 12.5 nm, 90.9% perovskite phase.

Catalysts 5A-5C (Comparative Catalyst 4+Doped $ZrO_2$)

The mixture ($MnO_x$:$La_{0.9}MnO_3$-doped $ZrO_2$) was made by dispersing the $MnO_x$:$La_{0.9}MnO_3$ and the doped-$ZrO_2$ [dopants: 10.1 wt % $Nb_2O_5$ (5A), 13.05% $Y_2O_3$ (5B) or 14.7% $Nd_2O_3$ (5C)] separately in water, followed by wet-milling to a $d_{90}$ of 6-7 µm. The $MnO_x$:$La_{0.9}MnO_3$ and doped-$ZrO_2$ slurries were then mixed in a 2:1 ratio for 3-4 hours before drying, grinding to a powder and calcination at 700° C.

Example 2 Stabilization Effect (After Hydrothermal Redox Aging)

Figure 1A:
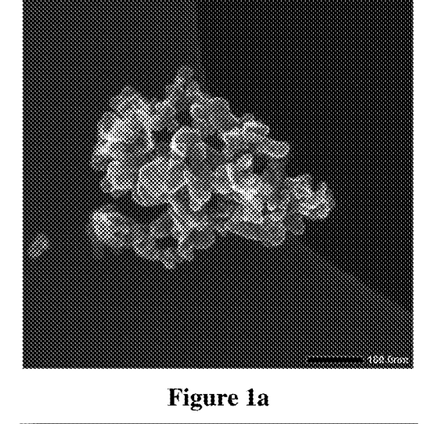
Figure 1B:
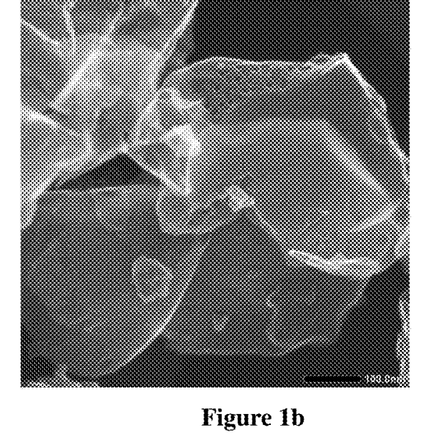
Figure 1C:
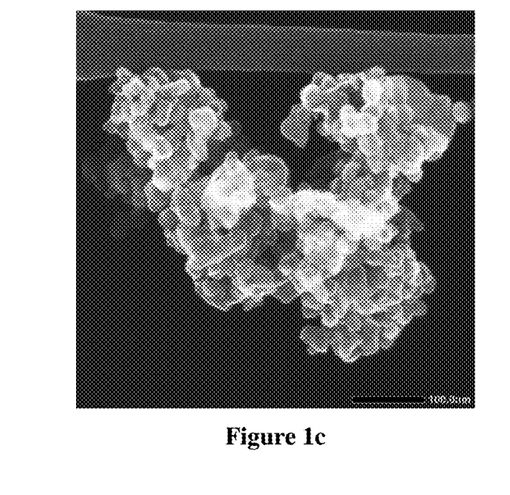
Figure 1D:
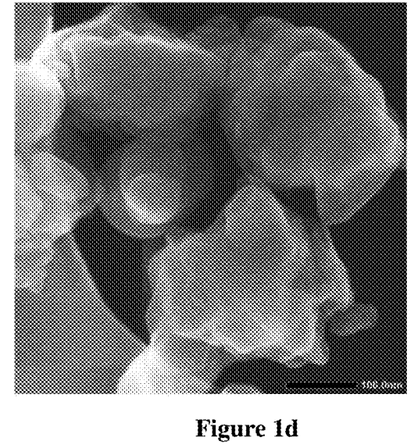
Figure 2A:
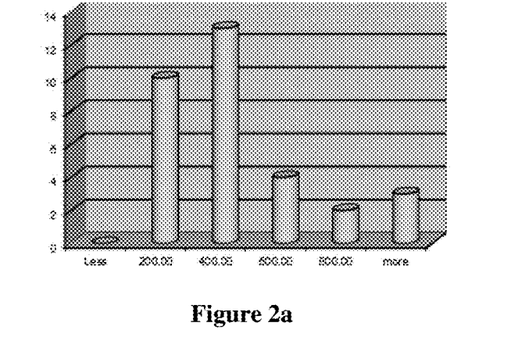
Figure 2B:
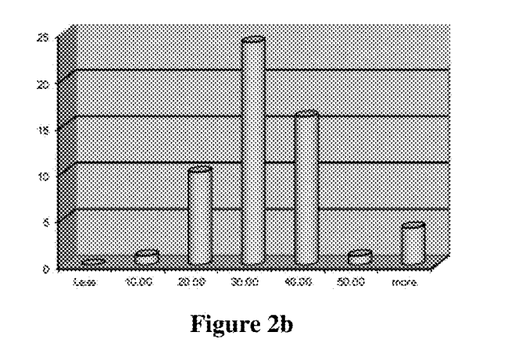
Figure 2C:
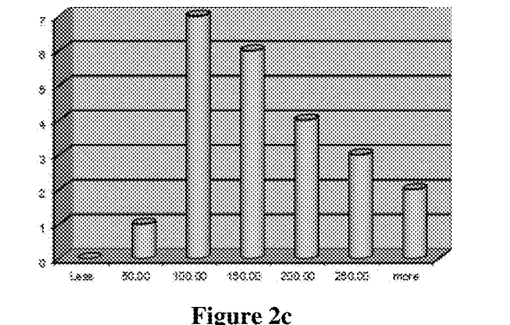

As shown in FIGS. 1 and 2, TEM images indicate the primary particle sizes of Comparative Catalyst 4 are stabilized after ageing in presence of doped-$ZrO_2$ (10.1 wt % $Nb_2O_5$; Catalyst 5A). The particle size increases from an initial 20-80 nm for the $MnO_x$:$La_{0.9}MnO_3$ fresh to 200-1000 nm aged in Comparative Catalyst 4. In presence of doped-$ZrO_2$ (e.g., Catalyst 5A), the primary particles of $MnO_x$:$La_{0.9}MnO_3$ remain smaller, between 200-500 nm.

Example 3

Comparative Catalyst 4 and Catalyst 5A were tested under standard perturbed gasoline conditions at 500° C. The catalysts were then subjected to ageing conditions involving temperatures ≥950° C. in the presence of steam and under rich/lean conditions for 16 hours. The specific conditions are included below:

Testing conditions: Perturbed gas mixture (WHSV=750 $Lg^{-1}h^{-1}$), λ±0.05: 0.73-2.2% CO+666 ppm $C_3H_6$+333 ppm $C_3H_8$+2200 ppm NO+0.23-0.69% $H_2$+*$O_2$+14% $CO_2$+4% $H_2O$ ($N_2$ balanced) 3 s per perturbation Aging conditions: Perturbed gas mixture, λ=0.93-1.06: 0.5% CO+1000 ppm $C_3H_8$+1000 ppm NO+0.27-1.07% $O_2$+10% $H_2O$ ($N_2$ balanced) 5 mins per perturbation

TABLE 3

CO/HC/NO Conversions at 500° C. for Fresh and Aged Catalysts

| | Fresh | | | Aged | | |
|---|---|---|---|---|---|---|
| | CO Conversion | HC Conversion | NO Conversion | CO Conversion | HC Conversion | NO Conversion |
| Comparative Catalyst 4 | 77 | 52 | 23 | 28 | 15 | 7 |
| Catalyst 5A | 83 | 57 | 25 | 54 | 46 | 15 |

As shown in Table 3 above, Comparative Catalyst 4, when fresh, has >50% conversion of CO/HC and >20% conversion for NO under standard perturbed gasoline conditions at 500° C., however when subjected to aging conditions, the catalyst shows a severe deactivation resulting in CO/NO conversions ≤30% at 500° C. Catalyst 5A (which includes the doped $ZrO_2$), however, was able to retain more activity after the harsh aging conditions. To summarize, after aging at high temperatures, Comparative Catalyst 4 shows >65-70% loss in its ability to oxidise CO and HC, however, when the catalyst is mixed with doped $ZrO_2$ (e.g., Catalyst 5A), there is only an 12-35% change in its CO and HC conversion at 500° C.

The invention claimed is:

1. A three-way catalyst composition comprising a perovskite-type compound of formula (I): $La_zB_{1-q}B'_qO_{3\pm\delta}$ or formula (II): $[BO_x]_y$:$[La_zBO_{3\pm\delta}]_{1-y}$, and a non-redox active component; wherein B or B' is Fe, Mn, Co, Ni, Cu, Ti, or Zr;
q is in a range from 0 to 0.5;
δ is in a range from 0 to 0.6;
x is from 1 to 2.5;
y is from 1 to 30 wt %;
z is 0.6 to 1.1; and
wherein the perovskite-type compound has high surface area of at least 40 $m^2$/g.

2. The three-way catalyst composition of claim 1, wherein the perovskite-type compound is the compound of formula (I): $La_zBO_{3\pm\delta}$.

3. The three-way catalyst composition of claim 2, wherein B is Fe.

4. The three-way catalyst composition of claim 2, wherein B is Mn.

5. The three-way catalyst composition of claim 1, wherein the perovskite-type compound is the compound of formula (II): $[BO_x]_y$:$[La_zBO_{3\pm\delta}]_{1-y}$.

6. The three-way catalyst composition of claim 5, wherein B is Mn.

7. The three-way catalyst composition of claim 1, wherein the non-redox active component comprises an oxide.

8. The three-way catalyst composition of claim 1, wherein the non-redox active component comprises alumina.

9. The three-way catalyst composition of claim 1, wherein the non-redox active component comprises $ZrO_2$.

10. The three-way catalyst composition of claim 9, wherein the $ZrO_2$ is doped.

11. The three-way catalyst composition of claim 1, wherein the catalyst is substantially free of platinum group metals.

12. The three-way catalyst composition of claim 1, wherein the catalyst is free of platinum group metals.

13. The three-way catalyst composition of claim 1, wherein the perovskite-type compound is present in an amount of 5 wt % to 75 wt % of the catalyst composition.

14. The three-way catalyst composition of claim 1, wherein the non-redox active component is present in an amount of 25 wt % to 95 wt % of the catalyst composition.

15. The three-way catalyst composition of claim 1, wherein the perovskite-type compound and the non-redox active component are present in a weight ratio of 0.5:1 to 3:1.

16. A catalyst article for treating exhaust gas, comprising:
a. a substrate; and
b. the three-way-catalyst composition of claim 1.

17. A method of treating an exhaust gas from an internal combustion engine, comprising contacting the exhaust gas with a catalyst article comprising a substrate and the three-way-catalyst composition of claim 1.

18. The method of claim 17, wherein the three-way-catalyst composition provides:
(1) a fresh NO conversion at 500-600° C., and
(2) an aged NO conversion at 500-600° C. after aging the catalyst at a temperature of at least 700° C. for 20 hours in the presence of steam,
wherein a delta between the fresh NO conversion and the aged NO conversion is a decrease of less than 20%.

19. The method of claim 17, wherein the three-way-catalyst composition provides:
(1) a fresh HC or CO conversion at 500° C., and
(2) an aged HC or CO conversion at 500° C. after aging the catalyst at a temperature of at least 700° C. for 20 hours in the presence of steam,
wherein a delta between the fresh HC or CO conversion and the aged HC or CO conversion is a decrease of less than 50%.

* * * * *